United States Patent [19]

Hirsch

[11] 4,352,614

[45] Oct. 5, 1982

[54] TAMPER RESISTANT THREADED FASTENER

[75] Inventor: Herbert L. Hirsch, Yorba Linda, Calif.

[73] Assignee: Microdot Inc., Darien, Conn.

[21] Appl. No.: 171,367

[22] Filed: Jul. 23, 1980

[51] Int. Cl.³ .................... F16B 37/00; F16B 23/00
[52] U.S. Cl. ............................... 411/427; 411/402; 411/910; 81/121 R
[58] Field of Search ............. 411/427, 911, 910, 405, 411/403, 402, 7; 81/121 R, 119, 120, 71

[56] References Cited

FOREIGN PATENT DOCUMENTS

| | | | |
|---|---|---|---|
| 631004 | 11/1961 | Canada | 411/402 |
| 2810067 | 9/1979 | Fed. Rep. of Germany | 411/911 |
| 1424148 | 11/1965 | France | 411/402 |

*Primary Examiner*—Ramon S. Britts
*Attorney, Agent, or Firm*—Lyman R. Lyon

[57] ABSTRACT

A device for effecting a generally tamper resistant threaded connection. The device includes a threaded fastener and a tool for driving and setting the fastener. The fastener has an internally threaded body portion, and a hollow cylindrical axially extending tool engaging portion spaced radially outward from the body portion and interconnected therewith. The tool engaging portion has a generally serrated driving surface defined by a plurality of circumferentially spaced recesses for receiving a like number of complementary shaped projections on the tool. The recesses and the projections cooperate to establish a driving connection between the fastener and the tool when the tool is turned in a direction for driving and setting the fastener. When the tool is turned in a direction for backing-off the fastener once it has been set, the recesses and the projections cooperate to slidingly eject the projections from the recesses to break the driving connection between the tool and the fastener.

1 Claim, 6 Drawing Figures

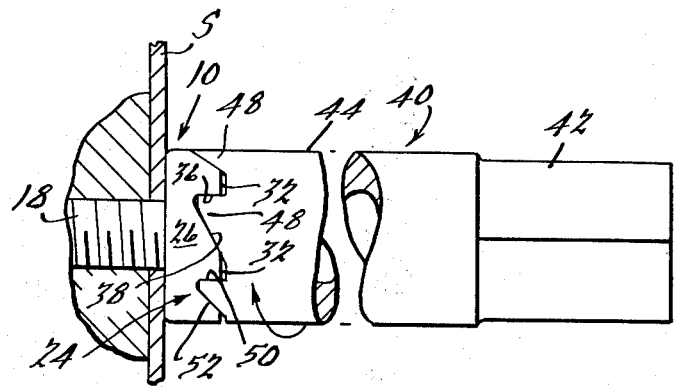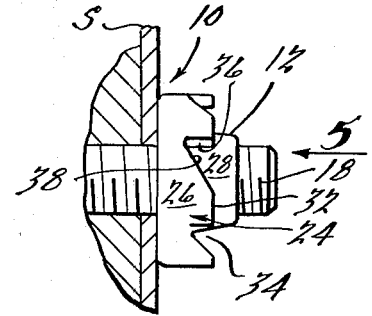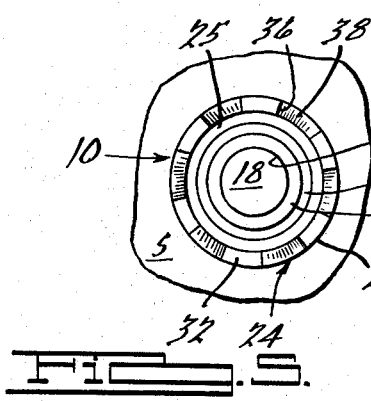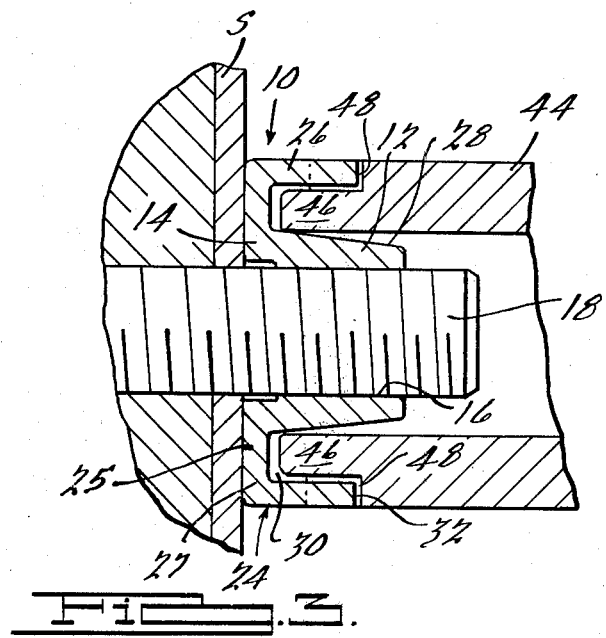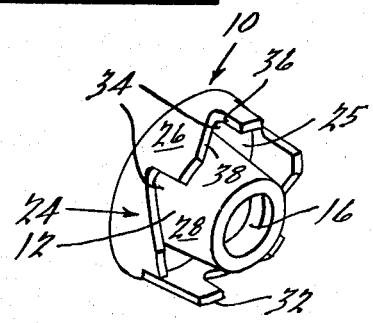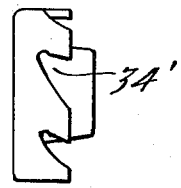

4,352,614

TAMPER RESISTANT THREADED FASTENER

BACKGROUND AND SUMMARY OF THE INVENTION

The present invention relates to fasteners, and more particularly to a tamper resistant threaded fastener for composite applications, as well as a fastener-tool system for achieving a tamper resistant threaded connection.

Prior known devices for achieving a tamper resistant threaded connection have included threaded fasteners having torque-limiting tool engaging portions designed to fail in shear and separate from a threaded body to leave a generally smoothly contoured threaded connection to which it is difficult to apply a torque for removing the fastener. However, such fasteners possess the disadvantage of requiring costly close tolerance machining operations for achieving generally complicated configurations which accomplish the desired result. Moreover, while the resulting smoothly contoured assembly of such devices is well suited to prevent the application of a torque for backing-off the fastener once it has been set, such an assembly inhibits or prevents a re-torquing of the fastener if necessary. The provision for re-torquing is highly desirable when sealants or adhesives are utilized with threaded fasteners. Such compositions can cause a change in stack dimensions due to curing or bleed-out, a situation which occurs frequently in composite applications. When this condition occurs, a re-torquing of the fastener is often advisable, if not imperative.

It is therefore desirable to provide a tamper resistant threaded fastener of a relatively simple configuration which can be manufactured using simpler and less expensive methods, as well as a tool for driving such a fastener. It is moreover desirable to provide such a tamper resistant fastener which maintains its wrenching capability after installation so that it can be re-torqued if necessary.

The tamper resistant threaded fastener of the present invention includes an internally threaded body portion for receiving a threaded bolt, and a hollow cylindrical driving portion spaced radially outward from and interconnected with the body portion by a radial flange. The driving portion includes a serrated driving surface which defines a plurality of recesses spaced circumferentially about the driving portion and adapted to receivably engage a like number of generally complementary shaped projections on a driving tool. These recesses and projections cooperate to establish an operative connection between the driving portion and the driving tool when the tool is rotated in a direction for advancing and setting the fastener. However, the recesses and projections cooperate to eject the projections from the recesses and break this connection if the tool is rotated in a direction for backing-off the fastener once it has been set. The fastener can be manufactured in a simple stamping operation and therefore can be made more cheaply than prior known devices. It therefore provides a simplified, less expensive device for achieving a tamper resistant threaded connection. The fastener is particularly suited for use in composite applications, since it provides an assembled configuration which, while inhibiting the application of a back-off torque to the assembly, allows a user to apply additional torque for resetting the fastener as desired.

The above and other features of the invention will become apparent from a reading of the detailed description of the preferred embodiments which make reference to the following set of drawings, in which:

BRIEF DESCRIPTION OF THE DRAWINGS

FIG. 1 is a perspective view of one embodiment of a tamper resistant threaded fastener in accordance with the present invention;

FIG. 2 is an elevational view of the fastener in combination with the driving tool of the present invention during installation of the fastener;

FIG. 3 is a sectional view of the fastener and driving tool in operative engagement during installation;

FIG. 4 is an elevational view of the fastener as installed;

FIG. 5 is an end view of the fastener, taken in the direction of Arrow 5 of FIG. 4; and FIG. 6 is an elevational view of another embodiment of a fastener in accordance with the invention.

DETAILED DESCRIPTION OF THE PREFERRED EMBODIMENTS

Referring now to the drawings, a tamper resistant threaded fastener in accordance with the present invention is shown generally at 10. The fastener 10 includes an elongated body portion 12 having a base 14 at one end and an axial bore 16 extending therethrough. Bore 16 is provided with threads of one hand at least partially therealong for threadably receiving a complementary threaded bolt 18.

The fastener 10 also includes a hollow cylindrical tool engaging or driving portion 24 which is spaced radially outward from body portion 12 and is interconnected therewith adjacent base 14 by a radially extending flange 25. Driving portion 24 includes a cylindrical collar 26 which is interconnected with and extends circumferentially about flange 25 at its outer periphery 27. Collar 26 cooperates with flange 25 and the outer peripheral surface 28 of body portion 12 to define an annular well 30, whose purpose and function will be described more fully hereinafter. As shown most readily in FIGS. 3 and 5, collar 26 extends generally in an axial direction normally of flange 25 and terminates in an end surface 32 having a plurality of similarly shaped recesses 34 spaced circumferentially thereabout. Each of these recesses 34 is defined by two intersecting surfaces 36 and 38. As illustrated in the drawings, each surface 36 extends generally axially along collar 26, while each surface 38 is disposed at an angle to surface 36 so that surfaces 36 and 38 intersect to form a generally sawtoothed shaped recess 34. In this manner, the recesses 34 give end surface 32 a generally serrated appearance.

The driving tool 40 utilized for installing the fastener 10 is illustrated in FIGS. 2 and 3. The tool 40 includes a gripping portion 42 adapted to be received and turned by a powered rotary driver (not shown). Formed integrally with gripping portion 42 is an elongated hollow cylindrical driver 44. Driver 44 is formed with a guide portion 46 of a reduced radial thickness which is adapted to be received within well 30 of fastener 10 upon axial advancement of the tool 40 toward the fastener 10. The driving tool 40 also includes a plurality of circumferentially spaced projections 48 disposed at the end of driver 44 adjacent guide portion 46. Each projection 48 is a generally sawtoothed shaped member defined by a generally axially extending first surface 50 and an inclined surface 52. As is readily apparent, projections 48 are suitably spaced about driver 44 and are of a shape complementary to recesses 34 so that each projection 48 can be received within a recess 34 upon axial advancement of the tool 40 toward the fastener 10. By reason of the configuration of recesses 34 and projections 48, the rotation of the tool 40 and the fastener 10 in the direction of the threads provided within bore 16 will effect an engagement of surfaces 36 and 50 of recesses 34 and projections 48, respectively. Such engagement will establish an operative connection between the tool 40 and the fastener 10 to enable the fastener 10 to be turned and advanced by tool 40 along bolt 18 and set with respect to workpiece S.

To utilize the fastener-tool combination of the present invention, the fastener 10 is threaded onto bolt 18 which has been preassembled with workpiece S. The tool 40 is thereafter operatively connected with the fastener 10 by advancing the driver 44 axially toward the fastener 10 for insertion of guide portion 46 into well 30. The driver 44 is then rotated to effect a proper angular alignment of the driver 44 to enable the insertion of projections 48 into recesses 34. The tool 40 and the fastener 10 may thereafter be turned by a powered rotary driver for advancing, torquing and setting the fastener 10 on bolt 18 with respect to workpiece S.

Once the fastener has been properly torqued and set to effect a threaded connection with bolt 18, the configuration of projections 48 and recesses 34 will inhibit the application of a reverse torque for backing-off the fastener 10 in the following manner. Rotation of the tool 40 in a direction opposite to the hand of the threads in bore 16 will establish an engagement between surfaces 38 of recesses 34 and surfaces 52 of projections 48. However, due to the inclined nature of these surfaces, the frictional forces established therebetween will be insufficient to overcome the torque to which the fastener has been subjected. Rotation of the tool 40 in this direction will therefore force surfaces 52 of projections 48 to slip relative to and slide along surfaces 38 of recesses 34 and force an axial withdrawal of projections 48 from recesses 34. Further rotation of the tool 40 in this direction will effect further axial displacement of the tool 40 with respect to the fastener 10 so that projections 48 will eventually be ejected from recesses 34 and the operative connection between the tool 40 and the fastener 10 will be broken.

An alternative embodiment of a fastener in accordance with the present invention can be provided with recesses 34' of a generally undercut configuration, such as illustrated in FIG. 6. In this embodiment the projections 48 on driver 44 are of a shape complementary to that of recesses 34'. A fastener-tool combination with recesses and projections of this type provides an improved wrenching configuration in addition to the features described hereinabove.

As is readily apparent, the above-described features of the preferred embodiments of the invention provide a simple and efficient method and structure for effecting a generally tamper resistant threaded connection. The level of torque at which such a tamper resistant connection is effected can be controlled by the geometry of the recesses 34 and projections 48, the material properties of the tool 40 and fastener 10, as well as the amount of axial force directed to the fastener 10 through the tool 40. Each of these factors bears upon the overall frictional characteristics governing the engagement between surfaces 38 and 52, and therefore the yield point at which projections 48 will slip relative to recesses 34.

A fastener in accordance with either of these embodiments of the invention can be formed in a simple stamping operation. This fact, coupled with the previously described features, results in a generally tamper resistant fastener of a simpler and more economical configuration possessing cost advantages over prior known devices for achieving a generally tamper resistant threaded connection.

In addition to the above-described features, the fastener 10 also yields a tamper resistant threaded connection which maintains its wrenching capability after installation. A provision for re-torquing is highly desirable when sealants or adhesives are utilized with threaded fasteners. As previously indicated, such compositions can cause a change in stack dimensions due to curing or bleed-out a situation which occurs frequently in composite applications. As previously noted, prior known tamper resistant fasteners yield a threaded assembly of a generally smoothly contoured shape. While such an assembly is well-suited to prevent the application of a torque for backing-off the fastener once it has been set, it also inhibits or prevents a re-torquing of the fastener if necessary. In contrast, while the fastener 10 inhibits the application of a back-off torque, it retains a configuration which enables the application of additional torque for properly setting the fastener with respect to workpiece S if a change in stack dimensions occurs. It therefore provides a device which is specially suited for use in composite applications since it avoids the problems associated with the previously described devices.

It is understood that the foregoing description is that of the preferred embodiments of the invention and that various changes and modifications may be made thereto without departing from the spirit and scope of the invention, as defined in the appended claims.

What is claimed is:

1. A system for effecting a generally tamper resistant threaded connection, said system comprising a nut having an internally threaded cylindrical shank and a radial flange extending substantially perpendicular to the longitudinal axis of the shank adjacent one end thereof, the flange on said nut having an integrally reentrantly formed axially extending hollow cylindrical tool engaging portion disposed at its radially outer periphery in radially spaced relation to the shank portions of said nut, said tool engaging portion having an axially facing annular edge face through which a torque may be applied to said nut, a driving tool having a circular central recess complementary to the cylindrical shank on said nut for the acceptance thereof in guiding relationship, and engagement means between said driving tool and the tool engaging portion of said nut for applying a torque to said nut through the tool engaging portion thereof when said driving tool is rotated in one direction, but which enables relative rotational movement between said driving tool and the tool engaging portion of said nut when said driving tool is rotated in the opposite direction, said engagement means comprising a plurality of spaced recesses on the edge face of the tool engaging portion of said nut, each recess having a drive surface and a slip surface, and a like number of generally complementary shaped projections on said driving tool which are receivable within said recesses and which coact with the drive surface of each recess to establish said operative connection upon rotation of said driving tool in said one direction and with said slip surface of each recess to permit relative rotation between said driving tool and said nut upon rotation of said driving tool in the opposite direction, the slip surface of each recess effecting axial movement of said driving tool away from the tool engaging portion of said nut and withdrawal of the projections thereon from said recesses upon rotation of said driving tool in said opposite direction, the shank on said nut guiding said tool upon relative rotation and axial withdrawal movement of said tool from said nut until the projections on said tool are completely disengaged from the drive surfaces of said recesses to preclude radial displacement of said tool relative to said nut prior to driving disengagement therebetween.

* * * * *